(12) United States Patent
Van Bogaert et al.

(10) Patent No.: US 8,192,322 B2
(45) Date of Patent: Jun. 5, 2012

(54) WIND TURBINE DRIVE

(75) Inventors: Annaïk Van Bogaert, Huldenberg (BE); Rik Verbiest, Land Van Waaslaan (BE); Warren Smook, Huldenberg (BE)

(73) Assignee: ZF Wind Power Antwerpen N.V., Kontich (BE)

( * ) Notice: Subject to any disclaimer, the term of this patent is extended or adjusted under 35 U.S.C. 154(b) by 852 days.

(21) Appl. No.: 12/328,044

(22) Filed: Dec. 4, 2008

(65) Prior Publication Data
US 2009/0149293 A1      Jun. 11, 2009

(30) Foreign Application Priority Data
Dec. 6, 2007   (BE) .................................. 2007/0582

(51) Int. Cl.
F16H 57/08 (2006.01)

(52) U.S. Cl. ....................................................... 475/331

(58) Field of Classification Search .......... 475/331–348; 384/549; 290/55
See application file for complete search history.

(56) References Cited

U.S. PATENT DOCUMENTS

| | | | | |
|---|---|---|---|---|
| 3,174,810 A | * | 3/1965 | Roubal | 384/549 |
| 5,368,528 A | * | 11/1994 | Farrell | 475/348 |
| 2006/0148612 A1 | * | 7/2006 | Albers et al. | 475/331 |
| 2006/0293142 A1 | * | 12/2006 | Torres et al. | 475/331 |

FOREIGN PATENT DOCUMENTS

| | | |
|---|---|---|
| EP | 1 677 032 | 7/2006 |
| EP | 1 855 001 | 11/2007 |
| WO | 03/031811 | 4/2003 |

OTHER PUBLICATIONS

Belgian Search Report issued in corresponding Belgian Patent Application.

* cited by examiner

*Primary Examiner* — Justin Holmes
(74) *Attorney, Agent, or Firm* — Young & Thompson

(57) ABSTRACT

Wind turbine drive which is formed of a rotor with a rotor shaft and of a transmission box with a planetary gear unit which is connected to the rotor shaft, which drive is of the type whereby the transmission box is supported by the far end of the rotor shaft and is provided with a reaction arm, whereby the rotor shaft is bearing-mounted with at least one bearing which is directly fixed to the nacelle and a second bearing which is either fixed to the nacelle or which is part of the transmission box, whereby the planet carrier of the planetary gear unit is bearing-mounted in the gearbox via one bearing at the most.

20 Claims, 7 Drawing Sheets

WIND TURBINE DRIVE

BACKGROUND OF THE INVENTION

The present invention concerns a wind turbine drive.

In particular, the present invention concerns a wind turbine drive formed of a rotor with a rotor shaft and of a transmission box with a planetary gear unit which is connected to said rotor shaft.

More specifically, the invention concerns a wind turbine drive of the type whereby the transmission box is supported by the far end of the rotor shaft and is provided with a reaction arm which, while the planetary gear unit is working, transmits a reaction torque round the rotary shaft from the transmission box to the nacelle so as to prevent the transmission box from turning along with the rotor shaft, and whereby the rotor shaft is bearing-mounted with at least one bearing which is directly connected to the nacelle and a second bearing which is either fixed to the nacelle in case of a direct rotor bearing, or which is part of the transmission box in case of an indirect rotor bearing.

DESCRIPTION OF THE RELATED ART

Such a wind turbine drive is already known according to the state of the art.

The planet carrier of the planetary gear unit of such a known wind turbine drive is always bearing-mounted in the housing by means of two roller bearings which are usually placed axially in such a manner that the planet wheels of the planetary gear system are positioned between the pair of bearings.

Typical of such a wind turbine drive is that a major part of the rotor loads is directly transferred to the nacelle.

Indeed, in the first case of a direct rotor bearing, whereby the rotor shaft is bearing-mounted with two bearings which are fixed directly to the nacelle, there should ideally be transferred no load whatsoever, apart from the torque, from the rotor shaft to the housing via the reaction arm(s) of the transmission box.

However, because of the elastic transformations in the turbine drive, as well as because of the difference in rigidity of the construction at the contact points of the reaction arm(s) with the nacelle, in practice, part of the rotor loads will nevertheless be transferred via the bearings from the bearings of the planet carrier and the reaction arm(s) of the transmission box to the nacelle, apart from the torque.

In the second case of an indirect rotor bearing, whereby one of the bearings of the planet carrier of the transmission box also serves to support the rotor shaft, the transmission of the rotor load to the nacelle via the reaction arm(s) will of course be larger, but nevertheless relatively small compared to the known, more integrated designs of wind turbine drives, whereby the loads of the rotor shaft are entirely absorbed by one or several bearings of the transmission box.

An advantage of the type of wind turbine drive concerned by the invention is that, thanks to the small rotor load on the transmission box, there will be less demands as far as the used materials, the dimensions, the design, etc. of the transmission box is concerned.

However, the present designs are often overdimensioned.

For example, the bearings that are used at the driving shaft of the transmission box to support the planet carrier in the transmission box can typically absorb a load which is many times higher than the actual load.

This is simply due to the fact that the used bearings must be large enough to be able to mount them over the driving shaft of the planet carrier.

Naturally, this is disadvantageous to the cost price of such a wind turbine drive, as well as to the mounting thereof.

Moreover, large bearings are difficult to come by and they have a very long delivery time.

SUMMARY OF THE INVENTION

The present invention aims to remedy one or several of the above-mentioned and other disadvantages.

In particular, the present invention aims to provide a wind turbine drive which can resist the loads it is exposed to without being overdimensioned.

To this end, the present invention concerns a wind turbine drive which is formed of a rotor with a rotor shaft and of a transmission box with a planetary gear unit which is connected to the rotor shaft, which drive is of the type whereby the transmission box is supported by the far end of the rotor shaft and is provided with a reaction arm which, while the planetary gear unit is working, transmits a reaction torque round the rotary shaft from the transmission box to the nacelle so as to prevent the transmission box from turning along with the rotor shaft, whereby the rotor shaft is bearing-mounted with at least one bearing which is directly connected to the nacelle and a second bearing which is either fixed to the nacelle in case of a direct rotor bearing, or which is part of the transmission box in case of an indirect rotor bearing, and whereby the planet carrier of the planetary gear unit is further bearing-mounted in the gearbox by means of one bearing at the most.

An advantage of such a wind turbine drive according to the invention is that the planet carrier of the planetary gear unit is bearing-mounted with only one bearing instead of two bearings, as is the case in the known designs.

Naturally, this allows for enormous cost savings.

According to a preferred embodiment of a wind turbine drive according to the invention, the above-mentioned bearing of the planet carrier is arranged as an output bearing, whereby in particular the planet wheels of the planetary gear unit are axially situated between the above-mentioned bearing of the planet carrier and the rotor shaft or driving shaft.

The present embodiment is particularly advantageous in the case of a direct rotor bearing, as the bearing of the planet carrier is put axially far away from the support that is already present at the bearings of the rotor shaft, such that no unnecessary double support is obtained, which is the case in the present designs.

Moreover, the diameter of the planet carrier of the planetary gear unit is usually smaller on the side of the generator of the planet wheels than on the side of the rotor shaft, such that it is possible to select a bearing with a smaller diameter there, which bearing is usually more easily available and cheaper.

According to another preferred embodiment of a wind turbine drive according to the invention, the above-mentioned bearing of the planet carrier is arranged as an input bearing, whereby in particular the bearing of the planet carrier is axially situated between the planet wheels of the planetary gear unit and the rotor shaft.

Such an embodiment of a wind turbine drive according to the invention is particularly useful in case of an indirect rotor bearing, since the bearing of the planet carrier must in that case transmit a major part of the rotor load via the housing from the transmission box to the nacelle.

Naturally, the planet wheels and the planetary gear, as well as the sun gear should preferably be subjected as Little as possible to said rotor load, which is the case if the bearing of the planet carrier is axially situated between the planet wheels of the planetary gear unit and the rotor shaft.

The advantage of such a wind turbine drive according to the invention as opposed to the known wind turbine drives with indirect rotor bearings is that only one bearing is applied in the transmission box.

According to a preferred embodiment of a wind turbine drive according to the invention, the planet carrier of the transmission box is provided with an additional support.

Such an additional support may for example be a bearing roller, a supporting roller or a cam roller which additionally supports the planet carrier in a rotating manner in relation to the transmission box, or for example an elastic system which additionally supports the transmission box in relation to the nacelle.

Such an additional support may sometimes be necessary, as the loads on the bearing of the planet carrier are too large to be supported by a single bearing.

However, the advantage of the above-mentioned forms of additional support is that they are easily available, simple to manufacture and to be mounted and that they are much cheaper than if an additional bearing were to be provided as a support, as is the case with the existing wind turbine drives.

Thus, such an additional support offers a more economical and more appropriate solution to the problem without any overdimensioning.

According to a preferred embodiment of a wind turbine drive according to the invention, the additional support is an output support, whereby in particular the planet wheels are axially situated between a point of application of the additional support and the rotor shaft.

Such an embodiment is particularly advantageous if the bearing of the planet carrier is arranged as an input bearing, as is preferably the case with an indirect rotor bearing.

Indeed, the weight of the transmission box which is not supported by the rotor shaft must be additionally supported in that case, which is best done as far as possible from the already provided support at the inlet of the transmission box by means of the bearing of the planet carrier, in other words best at the outlet of the transmission box.

According to another preferred embodiment of a wind turbine drive according to the invention, the additional support is an inlet support, whereby in particular a point of application of the additional support is axially situated between the planet wheels of the planetary gear unit and the rotor shaft.

In an analogous way, we may conclude that this embodiment is particularly advantageous in the case of a direct rotor bearing, whereby the bearing of the planet carrier is arranged as an output bearing, such that, naturally, the planet carrier is preferably provided with an additional support at the inlet of the transmission box.

According to yet another preferred embodiment of an above-mentioned wind turbine drive with an additional support according to the invention, the reaction arm is provided in an arrangement in the vicinity of the bearing, whereby in particular the moment arm of the bearing of the planet carrier in relation to the reaction arm is smaller than the moment arm of the additional support in relation to the reaction arm.

Such an embodiment whereby the reaction arm is arranged in the vicinity of the bearing is advantageous in that the major part of the load which must be transferred from the planet carrier of the transmission box to the nacelle goes via the bearing of the planet carrier, such that when the reaction arm is arranged in the vicinity of the bearing, this part of the load is transferred directly to the nacelle or at least with a restricted flexural strain on the transmission box.

To sum it up, there are two embodiments of a wind turbine drive according to the invention which are very much preferred according to the invention.

The first case is an embodiment of a wind turbine drive according to the invention with a direct rotor bearing, whereby the bearing of the planet carrier is arranged as an output bearing, whereby the reaction arm is arranged in the vicinity of a bearing and there may also be provided an additional support which is an inlet support.

The second case is an embodiment of a wind turbine drive according to the invention with an indirect rotor bearing, whereby the bearing of the planet carrier is arranged as an input bearing, whereby the reaction arm is arranged in the vicinity of a bearing and there may also be provided an additional support which is an outlet support.

With these embodiments, all the above-mentioned advantages are obtained at once, namely that the major part of the load of the planet carrier is transferred to the nacelle by only one bearing, which bearing is efficiently positioned in relation to the already existing support of the rotor shaft, whereas it can transfer its load to the nacelle without all too large bending moments on the transmission box thanks to a positioning of the reaction arm in the vicinity of the bearing and whereby an additional support may be provided where it is most required without any overdimensioning.

According to another preferred embodiment of a wind turbine drive according to the invention, the bearing of the planet carrier is able to absorb moment loads.

A good example of such a bearing is for example a cone bearing of the double-row type, whereby for example the inner or the outer bearing ring is formed as a whole and is provided with two bearing surfaces for the two rows of roller elements of the bearing.

Such an embodiment of a wind turbine drive according to the invention lends sufficient stability to the rotor shaft and the transmission box, while the drive can nevertheless be made compact.

BRIEF DESCRIPTION OF THE INVENTION

In order to better explain the characteristics of the invention, the following preferred embodiments of a wind turbine drive according to the invention are described with reference to the accompanying drawings, in which.

Figure 1:
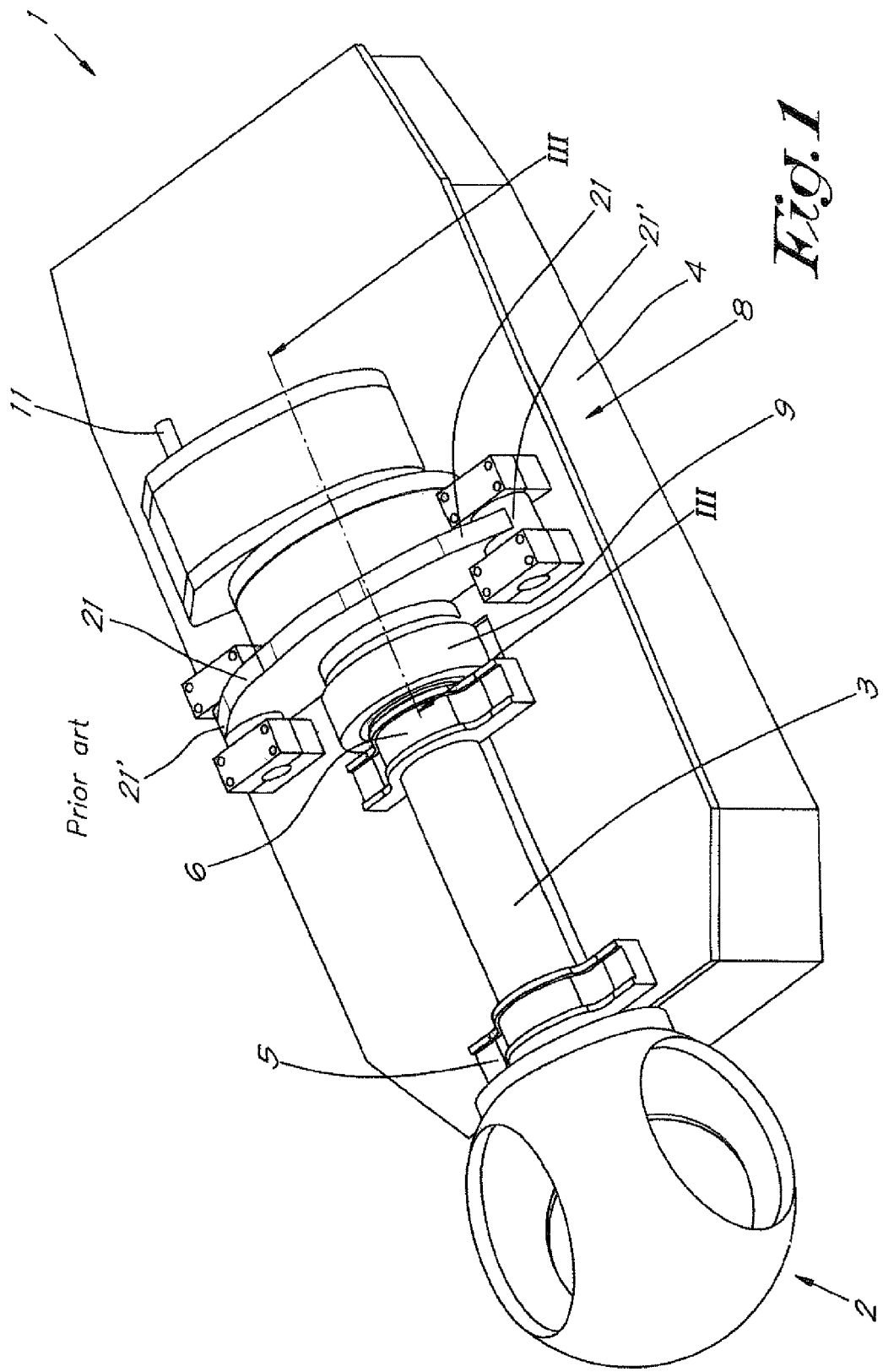
FIGS. 1 and 2 show two embodiments of known wind turbine drives in perspective, with a direct rotor bearing and an indirect rotor bearing respectively.
Figure 4:
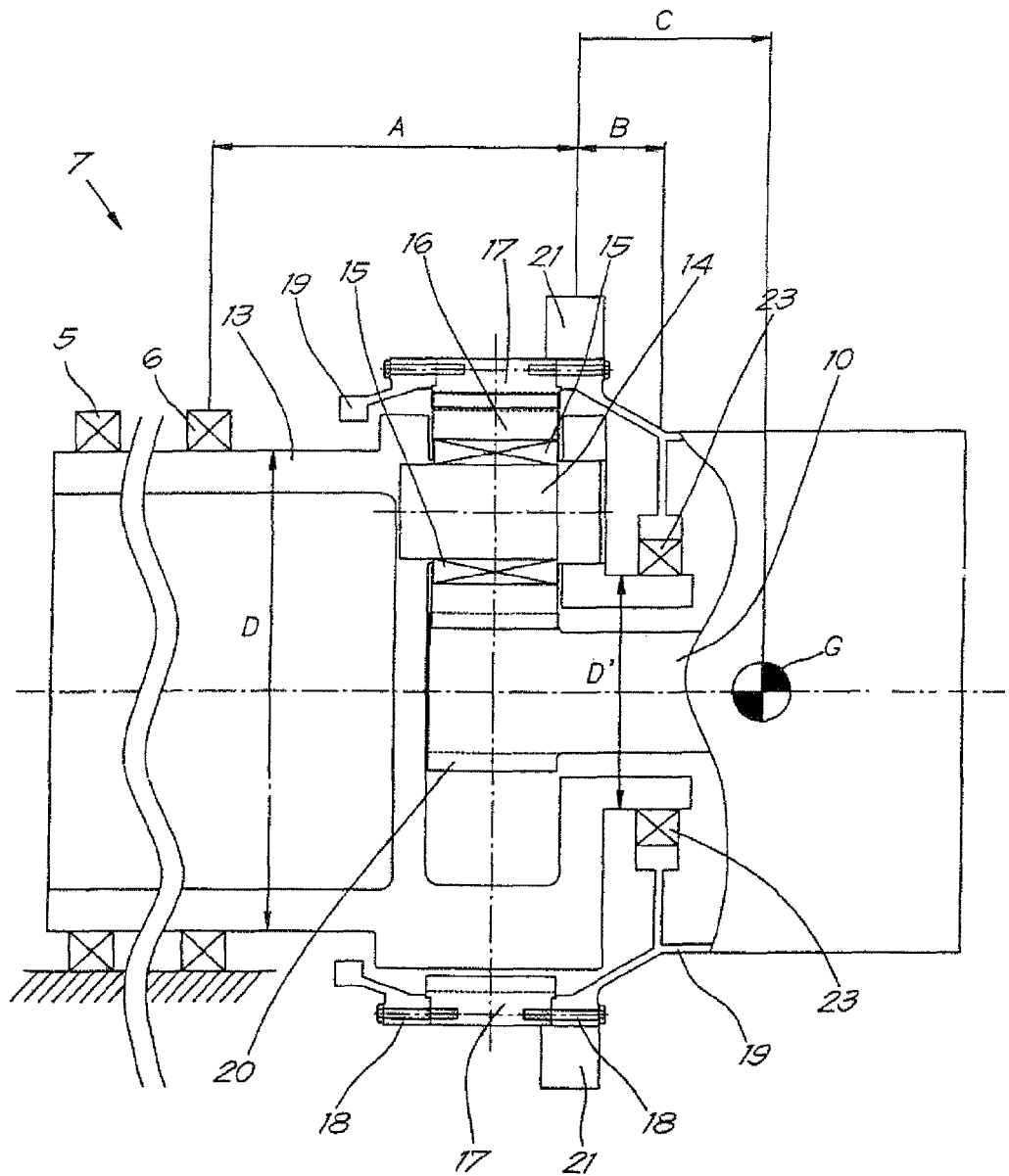
Figure 5:
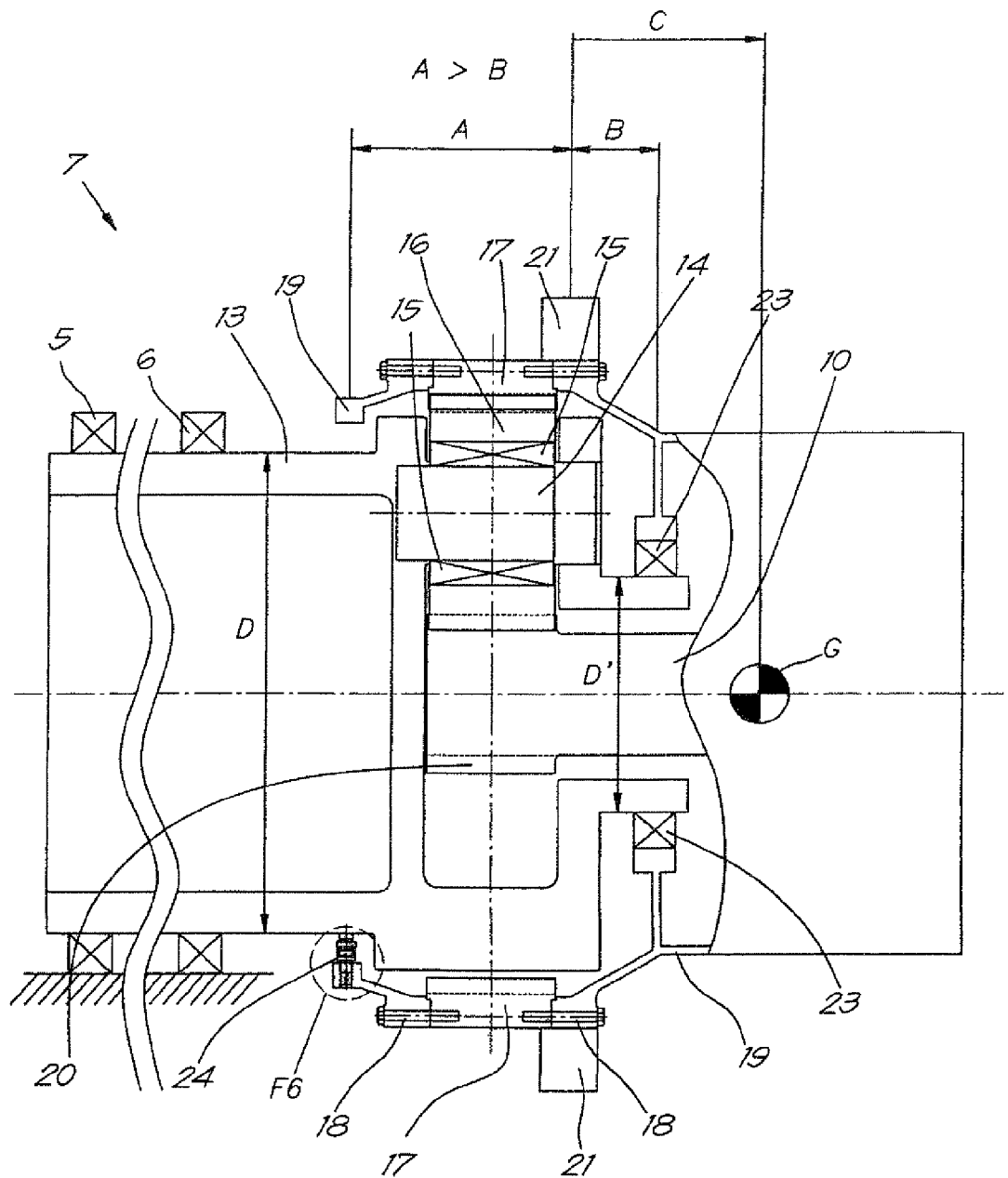
Figure 6:
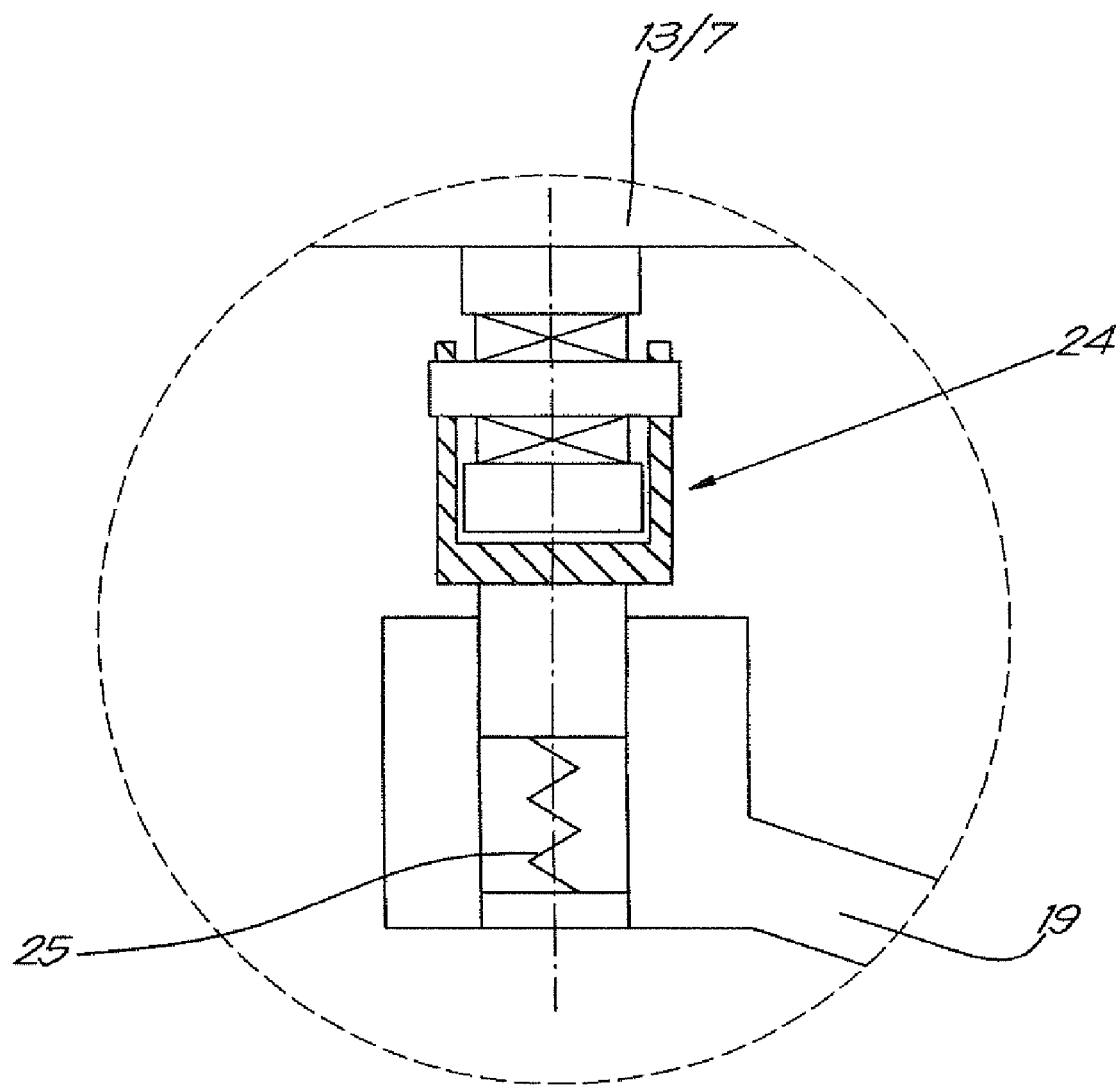
Figure 7:
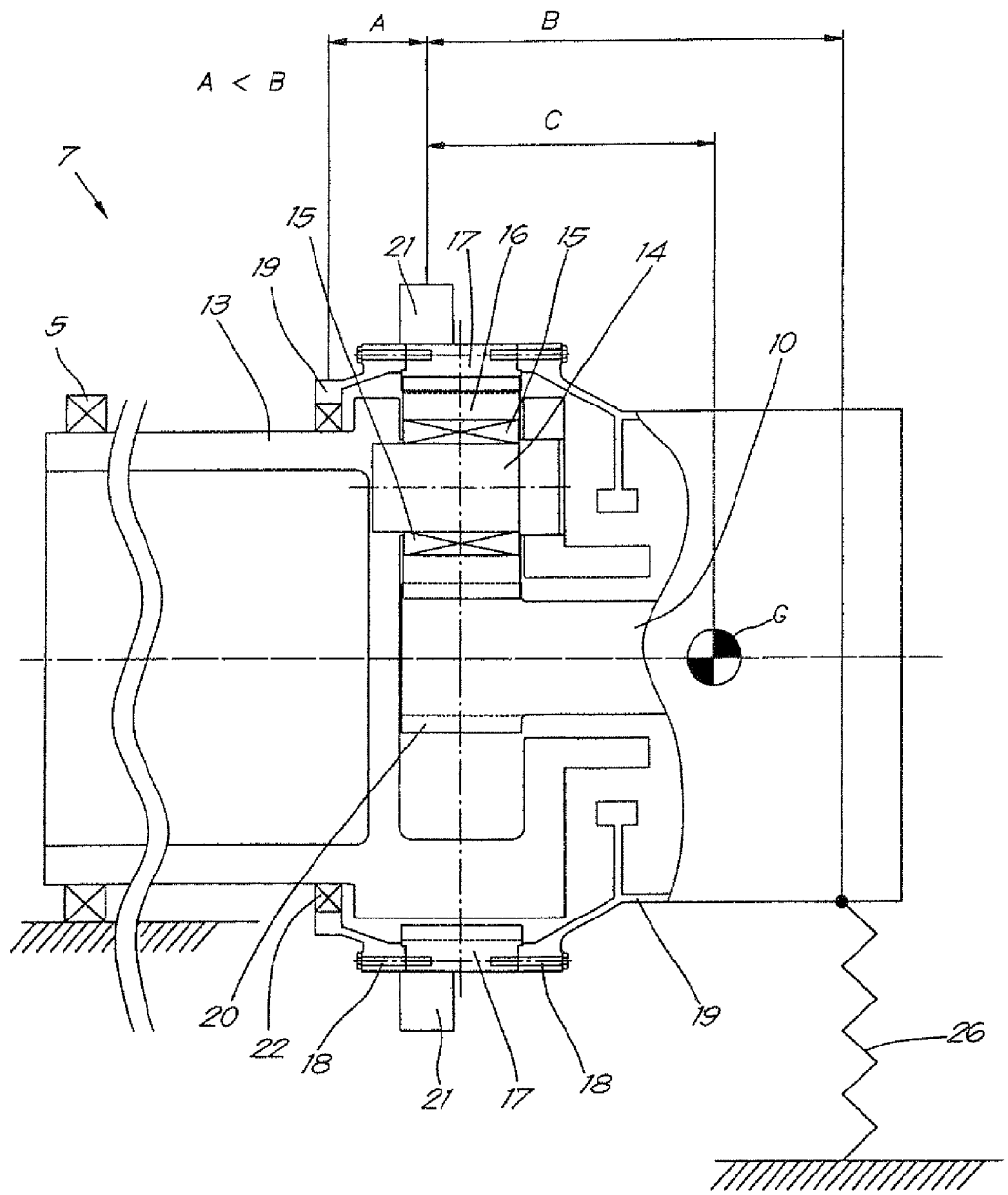

FIG. 4 in an analogous way shows a cross section according to the section III-III in FIG. 1, but for the most general embodiment of a wind turbine drive according to the invention;

FIG. 5, analogously to FIG. 4, shows another embodiment of a wind turbine drive according to the invention whereby an additional support is provided;

FIG. 6 represents the part indicated by F6 in FIG. 5 in more detail; and,

FIG. 7, analogously to FIGS. 4 and 5, shows yet another embodiment of a wind turbine drive according to the invention, whereby an alternative additional support has been provided.

DESCRIPTION OF THE PREFERRED EMBODIMENTS

Figure 3:
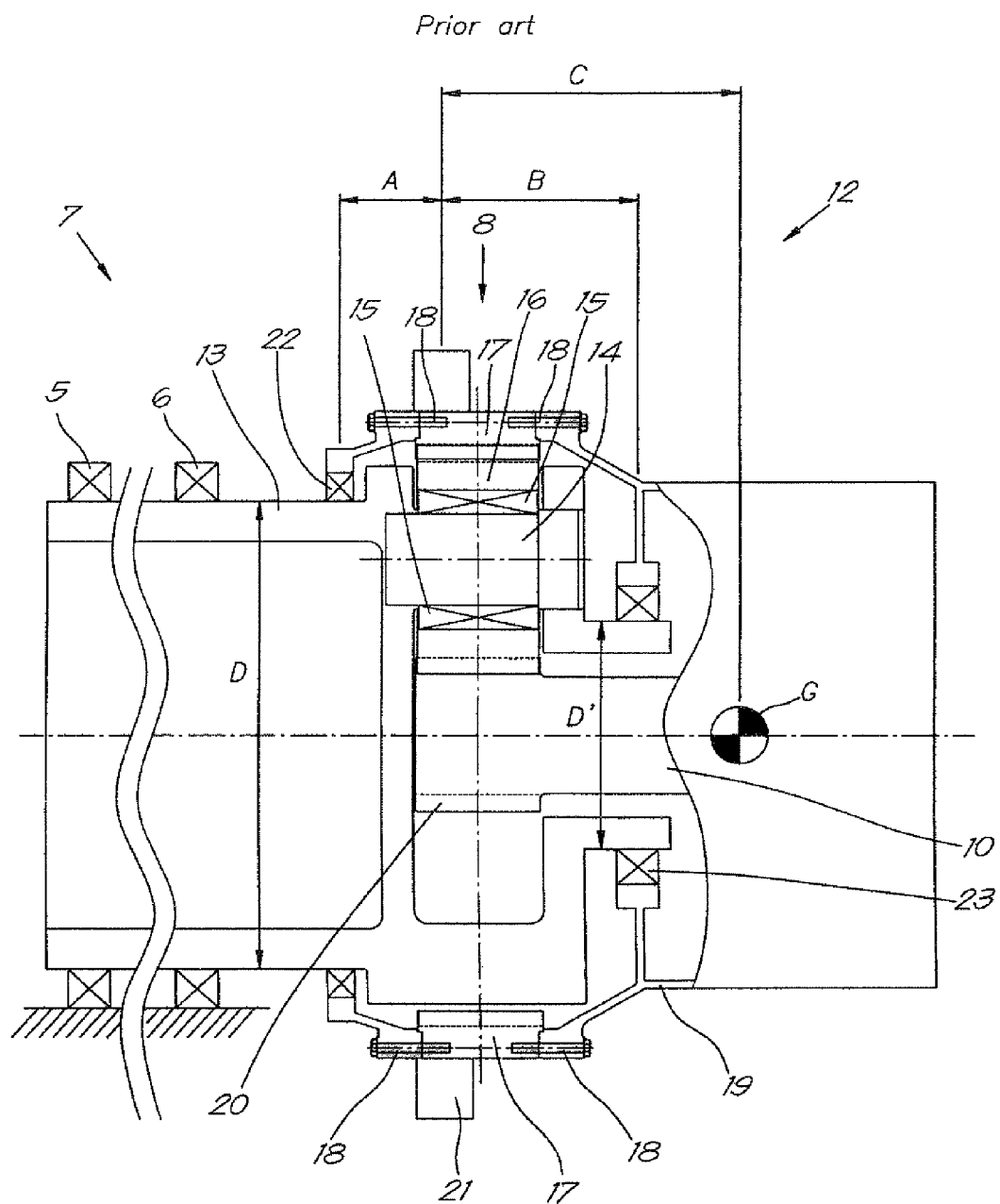
FIG. 3 shows a cross section of a wind turbine drive with a direct rotor bearing according to a section indicated with III-III in FIG. 1.

FIGS. 1 and 3 represent a known embodiment of a wind turbine drive 1.

This wind turbine drive 1 is formed of a rotor 2 with rotor blades, not represented in the figure, and which is supported by a rotor shaft 3.

The rotor shaft 3 is bearing-mounted in relation to the nacelle 4 by means of two bearings 5 and 6, which arrangement of the bearing of the rotor shaft 3 will hereafter be called a direct rotor bearing.

Further, the rotor shaft 3 is connected to the driving shaft 7 of a transmission box 8 by means of a coupling 9.

In this transmission box 8, the slow rotation of the rotor shaft 3 is converted into a faster rotation at a driven shaft 10 of a first stage of the transmission box 8 in order to obtain a rotation that is sufficiently fast to correctly drive an electric generator, not represented in the drawings, via the driven shaft 11 of the transmission box 8.

As is shown in more detail in the section of FIG. 3, a planetary gear unit 12 is often used to that end.

The driving shaft 7 of this planetary gear unit 12 is formed of a planet carrier 13 provided with planetary axles 14, on which planet wheels 16 are mounted in a rotating manner by means of planet bearings 15.

Said planet wheels 16 work in conjunction with a planetary gear 17 on the one hand, which is fixed to the housing 19 of the transmission box 8 by means of bolts 18, and with a sun gear 20 on the other hand which is provided on the driven shaft 10 of the first stage formed of said gear unit 12.

Figure 2:
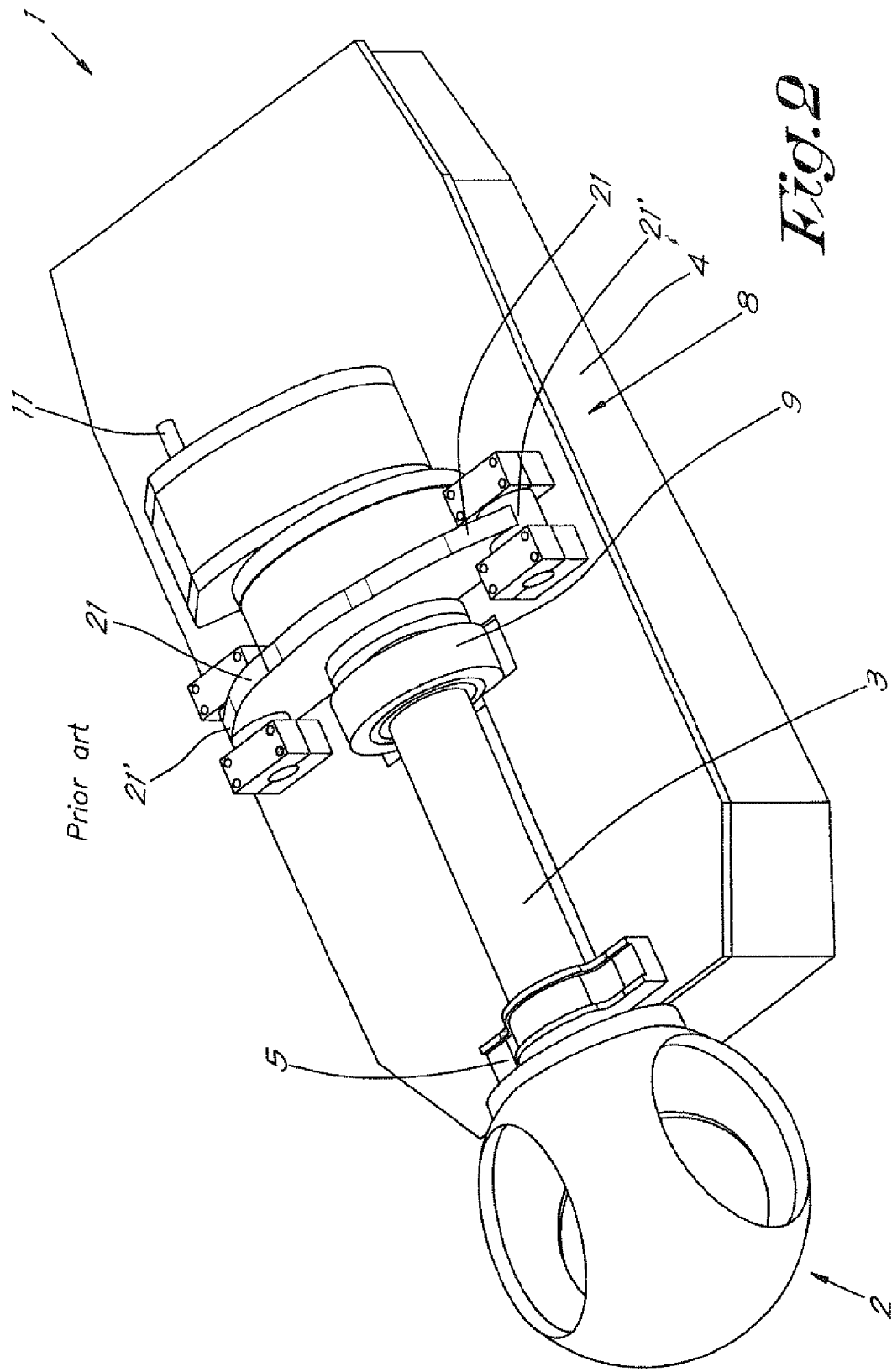

The embodiment of a known wind turbine drive 1 as represented in FIG. 2 is entirely analogous to that of FIGS. 1 and 3, except for the characteristic that the rotor shaft 3 is only bearing-mounted by means of one bearing 5 in relation to the nacelle 4, instead of by two bearings 5 and 6 as in the first example, whereby the rotor shaft 3 is further supported by bearings in the transmission box 8.

Such a bearing of the rotor shaft 3 will hereafter be called an indirect rotor bearing. It should be noted that the known wind turbine drives 1 concerned by the invention, as represented for example in FIGS. 1 to 3, are of the type whereby the transmission box 8 is almost only supported by a reaction arm 21 in relation to the nacelle 4 so as to bridge the reactive force which is required to make the planetary gear unit 12 function, as well as to prevent the transmission box 8 from turning along with the rotor shaft 3.

As set forth in the introduction, in the known wind turbine drives 1 of the above-mentioned type, the planet carrier 13 is bearing-mounted in the housing 19 of the transmission box 8 by means of two bearings 22 and 23.

They are usually axially placed in such a manner that they axially enclose the planet wheels 16.

As is further shown in FIG. 3, the bearing 22 on the rotor side of the planet wheels 16 usually has a diameter D which is larger than the diameter D' of the bearing 23 on the generator side of the planet wheels 16.

Moreover, it is clear that with a direct rotor bearing, whereby the rotor shaft 3 is bearing-mounted in relation to the nacelle 4 with two bearings 5 and 6, the load from the rotor 2 on the bearings 22 and 23 is rather restricted.

In particular, the bearings 22 and 23 are in this case subjected to only a part of the rotor load as a result of elastic transformations in the wind turbine drive 1, as well as due to differences in the rigidity of the contact points 21' of the reaction arms 21 with the nacelle 4.

These loads, which emanate from the rotor 2 and which must be transferred via the reaction arm 21 to the nacelle 4 by the transmission box 8, can be restricted by providing a low rigidity to the connection between the reaction arm 21 and the nacelle 4.

It is clear that, in the case of an indirect rotor bearing, whereby the rotor shaft 3 is bearing-mounted in relation to the nacelle 4 with only one bearing 5, as in the arrangement of FIG. 2, a larger part of the rotor load will be transferred by the bearings 22 and 23.

Apart from the loads emanating from the rotor 2, the bearings 22 and 23 also transfer the part of the load resulting from the weight G of the transmission box 8, which is not supported by the rotor shaft 3, to the nacelle 4 via the reaction arm 21.

The distribution of the different loads between the bearings 22 and 23 depends on the moment arms A, B and C, which are defined as follows:

A is the axial distance between the point of application of the reaction arm 21 and the point of support on the rotor side of the planet wheels 16 which is axially closest and via which loads of the rotor shaft 3 or the transmission box 8 are transferred to the reaction arm 21;

B is the axial distance between the point of application of the reaction arm 21 and the point of support on the generator side of the planet wheels 16 which is axially closest and via which loads of the rotor shaft 3 or the transmission box 8 are transferred to the reaction arm 21; and, C is the axial distance between the centre of gravity of the weight G of the transmission box 8, which is not supported by the rotor shaft 2, and the point of application of the reaction arm 21.

In the case of FIG. 3 this means that:

A is the axial distance between the bearing 22 and the point of application of the reaction arm 21;

B is the axial distance between the point of application of the reaction arm 21 and the bearing 23; and, C is as defined above.

In a typical design with a direct rotor bearing, as in FIGS. 1 and 3, whereby the rotor shaft 3 is supported by two bearings 5 and 6 in relation to the nacelle 4, the load on the bearings 22 and 23 will be mainly determined by the above-mentioned weight G of the transmission box 8 which is not supported by the rotor shaft 3.

It is noted that the bearing 22 which supports the planet carrier 13 is positioned very close to the bearing 6 of the rotor shaft 3, such that the bearing 22 is only subjected to a very limited load.

However, because of the large diameter D of the planet carrier 13, it is necessary to select a bearing 22 having such a large diameter D as well, such that the maximum load which the bearing 22 can resist is many times larger than the actual load which it should be able to absorb.

Also, this bearing 22 is overdimensioned in the known wind turbine drives 1 with a direct rotor bearing.

In a typical design with an indirect rotor bearing, as in FIG. 2, with only one bearing 5 which directly supports the rotor shaft 3 in relation to the nacelle 4, the moment arm A between the reaction arm and the point of support on the rotor side of the planet wheels 16 is usually small at the height of the bearing 22, as a result of which the bearing 22 will be loaded most by the rotor shaft 3.

The weight G of the transmission box 8 which is not supported by the rotor shaft 3 will in that case be rather absorbed by the bearing 23.

Naturally, this has for a result that the load on the bearing 22 is larger than in case of FIGS. 1 and 3.

Nevertheless, it is possible according to the invention, even in this case of an indirect rotor bearing, to introduce some simplifications whereby the loads are transferred from the transmission box 8 to the nacelle 4 without any overdimensioning.

FIG. 4 shows a first embodiment of a wind turbine drive 1 according to the invention whereby a solution is provided for the known case with a direct rotor bearing, as represented in FIGS. 1 and 3, whereby the rotor shaft is supported by two bearings 5 and 6 in relation to the nacelle 4.

The invention consists in bearing-mounting the planet carrier 13 of the planetary gear unit 12 in the gearbox 8 by means of only one bearing 23.

The bearing 22 of the known case in FIG. 3 has hereby been omitted, since this bearing 22, as explained before, is considerably overdimensioned.

Only the bearing 23 which is axially farthest away from the rotor shaft 3 was chosen to be preserved here, as this naturally results in less overlapping with the bearings 5 and 6 which support the rotor shaft 3 in relation to the nacelle 4.

Another advantage is that the diameter D' is smaller here than the diameter D.

The bearing 23 of the planet carrier 13 is further positioned such that the planet wheels 16 of the planetary gear unit 12 are axially situated between the bearing 23 and the rotor shaft 3.

In the present patent text will hereafter be alleged that the bearing 23 is arranged as an output bearing in such a configuration, whereby it will be pointed out that the bearing 23 is put at the outlet of the transmission box 8.

A part of the load of the rotor 2 can thus also be transferred to the reaction arm 21 by the planet wheels 16 without putting any additional load on the bearing 23.

Preferably, the bearing 23 of the planet carrier 13 according to the invention is capable of absorbing moment loads in a plane going through the geometrical axis of the rotor shaft 3.

A bearing of the double-row type can be selected to this end, for example a double-row cone bearing Preferably even, a double-row bearing 23 will be used according to the invention whose outer bearing ring or whose inner bearing ring is formed as a whole, whereby this bearing ring is provided with two bearing surfaces for the two rows of rolling elements of the bearing.

In certain cases, it may be interesting to pre-load the bearing 23 of the planet carrier 13 in the axial and/or radial direction so as to avoid any movements of the planet carrier 13 in relation to the transmission box 8 as a result of the play in the bearing 23.

FIGS. 5 and 6 show another embodiment of a wind turbine drive 1 according to the invention, which is entirely analogous to that of FIG. 4, save in that the planet carrier 13 is provided with an additional support.

This additional support must provide sufficient support to the rotor shaft 3, and in the given example it is not a bearing 22, as in the known wind turbine drives, but an additional support in the form of one or several bearing rollers 24, a detail of which is represented in FIG. 6.

Alternatively, use can also be made of supporting rollers 24 or cam rollers 24.

In the given example, this additional support 24 is positioned axially between the rotor shaft 3 and the planet wheels 16 at the height of the omitted bearing 22.

Such an arrangement with an additional support 24 at the inlet of the transmission box 8 will hereafter be called an inlet support.

It is clear that in this case of a direct rotor bearing, whereby the bearing 23 of the planet carrier 13 is arranged as an output bearing, it may be appropriate to additionally support the rotor shaft 3 at the inlet of the transmission box 8.

The difference with the existing wind turbine drives 15 is that such a supporting roller, cam roller or bearing roller 24 is much cheaper than a complete bearing 22 round the driving shaft 7, as is commonly used in the known wind turbine drives.

Moreover, such rollers 24 can be mounted relatively easily, especially in comparison with a complete bearing 22.

According to a preferred embodiment of the present invention, the supporting roller, bearing roller or cam roller 24 is provided with at least one radially elastic element 25, as is represented in more detail in FIG. 6.

The reaction arm 21 is preferably arranged in the vicinity of a bearing, i.e. the bearing 23 of the planet carrier 13.

This implies that the reaction arm 21 is best positioned as close as possible to the bearing 23 from an axial point of view, such that the moment arm B of the bearing 23 in relation to the reaction arm 21 is smaller than the moment arm A of the additional support 24 in relation to said reaction arm 21.

Consequently, the load on the bearing 23, which absorbs the major part of the load to be transferred, is transferred to the nacelle 4 as directly as possible, without generating any all too large bending moments in the transmission box 8.

Yet another embodiment of a wind turbine drive 1 according to the invention is represented in FIG. 7, whereby a solution is offered this time for the case with an indirect rotor bearing, as in FIG. 2, whereby the rotor shaft 3 is bearing-mounted directly on the nacelle 4 with only one bearing 5, while the remainder of the rotor load 3 is absorbed in the gearbox 8.

However, according to the invention, the planet carrier 13, as opposed to what is customary in the known wind turbine drives, is also bearing-mounted in the transmission box 8 with only one bearing 23.

As already explained in the introduction, it is advisable in this case with an indirect rotor bearing to arrange the bearing 22 of the planet carrier 13 as an input bearing, meaning that the bearing 22 of the planet carrier 13 is situated at the inlet of the transmission box 8, or in other words is axially situated between the planet wheels 16 of the planetary gear unit 12 and the rotor shaft 3.

Indeed, the bearing 22 must absorb a major part of the load on the rotor shaft 3 in case of an indirect rotor bearing.

By arranging the bearing 22 as an input bearing, the planet wheels 16, the planetary gear 17 and the sun gear 20 will be mostly safeguarded against said major load.

In order to partly relieve the bearing 22, it was decided this time to additionally support the transmission box 8 in relation to the nacelle 4 by means of an elastic system 26.

Said elastic system 26 in this case directly supports the weight G of the transmission box 8 which is not born by the rotor shaft 3 in relation to the nacelle 4 instead of via the bearing 22.

In this case of an indirect rotor bearing whereby a bearing 22 is arranged as an input bearing, which already partly is supports the transmission box 8, it is of course best to additionally support the transmission box 8 at the outlet of the transmission box 8, i.e. by means of an outlet support.

Also in this embodiment of a wind turbine drive 1 according to the invention, it is advantageous to arrange the reaction arm 21 in the vicinity of a bearing, whereby the moment arm A of the bearing 22 in relation to the reaction arm 21 is smaller this time than the moment arm B of the additional support 26 in relation to the reaction arm 21.

In this way, the major part of the load to be transferred, which is absorbed by the bearing 22 this time, is again transferred as directly as possible to the nacelle 4 without generating all too large bending moments in the transmission box 8.

It is clear that, in all the given examples of wind turbine drives 1 according to the invention whereby overdimensioning is avoided by using less components or cheaper components, an adapted design is obtained which is up to the loads it is subjected to, but which is cheaper and easier to mount than the known wind turbine drives.

Naturally, also many other embodiments are possible.

The invention is by no means restricted to the embodiments of a wind turbine drive 1 according to the invention described by way of example and represented in the accompanying drawings; on the contrary, such a wind turbine drive 1 can be made in many other ways while still remaining within the scope of the invention.

The invention claimed is:

1. A wind turbine drive (1), comprising:
    a nacelle (4);
    a rotor (2) with a rotor shaft (3); and
    a transmission box (8) with a planetary gear unit (12) connected to the rotor shaft (3),
    the planetary gear unit (12) comprising a planet carrier (13),
    the transmission box (8) supported by a far end of the rotor shaft (3),
    the rotor shaft (3) bearing-mounted with i) a first rotor bearing (5), the first rotor bearing (5) directly fixed to the nacelle (4), and ii) a second rotor bearing (6, 22), the second rotor bearing (6, 22) being one of i) fixed to the nacelle (4) in case of a direct rotor bearing, ii) a part of the transmission box (8) in case of an indirect rotor bearing,
    the transmission box (8) provided with a reaction arm (21), wherein during working of the planetary gear unit (12), the reaction arm (21) transmits a reaction torque round the rotor shaft (3) from the transmission box (8) to the nacelle (4) sufficient to prevent the transmission box (8) from turning along with the rotor shaft (3),
    the planet carrier (13) of the planetary gear unit (12) bearing-mounted in the transmission box (8) by only one planet carrier bearing (22,23) at the most, and
    the reaction arm (21) arranged adjacent the planet carrier bearing (22, 23).

2. The wind turbine drive (1) according to claim 1, wherein the planet carrier bearing (23) is arranged as an output bearing, with planet wheels (16) of the planetary gear unit (12) axially situated between the planet carrier bearing (23) and the rotor shaft (3).

3. The wind turbine drive (1) according to claim 1, wherein the planet carrier bearing (22) is arranged as an input bearing, with the planet carrier bearing (22) axially situated between planet wheels (16) of the planetary gear unit (12) and the rotor shaft(3).

4. The wind turbine drive (1) according to claim 1, further comprising:
    an inlet support (24) supporting the rotor shaft (3),
    the inlet support not being a rotor bearing.

5. The wind turbine drive (1) according to claim 4, wherein the inlet support is a bearing roller, a supporting roller or a cam roller (24) which additionally supports the planet carrier (13) in a rotating manner in relation to the transmission box (8).

6. The wind turbine drive (1) according to claim 5, wherein the bearing roller, supporting roller or cam roller (24) is provided with an elastic element (25).

7. The wind turbine drive (1) according to claim 4, wherein the inlet support is an elastic system (26) which additionally supports the transmission box (8) in relation to the nacelle (4).

8. The wind turbine drive (1) according to claim 1, further comprising an outlet support (24, 26), whereby the planet wheels (16) are axially situated between a point of application of the outlet support and the rotor shaft (3).

9. The wind turbine drive (1) according to claim 4, wherein the inlet support, whereby a point of application of the inlet support (24,26) is axially situated between the planet wheels (16) of the planetary gear unit (12) and the rotor shaft (3).

10. The wind turbine drive (1) according to claim 4, wherein a moment arm (A,B) of the planet carrier bearing (22,23) in relation to the reaction arm (21) is smaller than a moment arm (B,A) of the inlet support (24,26) in relation to the reaction arm (21).

11. The wind turbine drive (1) according to claim 2, wherein the rotor shaft (3) is bearing-mounted according to a direct rotor bearing.

12. The wind turbine drive (1) according to claim 3, wherein the rotor shaft (3) is bearing-mounted according to an indirect rotor bearing.

13. The wind turbine drive (1) according to claim 1, wherein the planet carrier bearing (23) can absorb moment loads.

14. The wind turbine drive (1) according to claim 1, wherein the planet carrier bearing (23) is of the double-row type.

15. The wind turbine drive (1) according to claim 14, wherein one of i) an outer bearing ring, and ii) an inner bearing ring of the of planet carrier bearing (23) is formed as a whole and is provided with two bearing surfaces for the two rows of roller elements of the planet carrier bearing (23).

16. The wind turbine drive (1) according to claim 1, wherein the planet carrier bearing (23) is a cone bearing.

17. The wind turbine drive (1) according to claim 1, wherein the planet carrier bearing (23) is preloaded in one of the axial direction and the radial direction in order to prevent any movement of the planet carrier (13) in relation to the transmission box (8) as a result of any play in the bearing (23).

18. The wind turbine drive (1) according to claim 2, further comprising:
    an inlet support (24) positioned axially between the rotor shaft (3) and the planet wheels (16),
    the inlet support (24) supporting the rotor shaft (3),
    the inlet support not being a rotor bearing,
    the inlet bearing (24) being a bearing rollers (24), a supporting roller (24), and a cam roller (24).

19. A wind turbine drive (1), comprising:
    a nacelle (4);
    a rotor (2) with a rotor shaft (3) having a far end;
    a transmission box (8) with i) a reaction arm (21), and ii) a planetary gear unit (12) connected to the rotor shaft (3), the planetary gear unit (12) comprising a planet carrier (13), the transmission box (8) supported by the far end of the rotor shaft (3); and
    first and second rotor bearings (5, 6) supporting the rotor shaft (3) in relation to the nacelle (4), the first rotor bearing (5) being directly fixed to the nacelle (4), the second rotor bearing (6) being directly fixed to the nacelle (4),
    the rotor shaft (3) bearing-mounted with i) the first rotor bearing, and ii) the second rotor bearing,
    wherein during working of the planetary gear unit (12), the reaction arm (21) transmits a reaction torque round the rotor shaft (3) from the transmission box (8) to the nacelle (4) sufficient to prevent the transmission box (8) from turning along with the rotor shaft (3), the planet carrier (13) bearing-mounted in the transmission box (8) by only one planet carrier bearing (23) at the most, and the reaction arm (21) arranged adjacent the planet carrier bearing (23).

20. A wind turbine drive (1), comprising:

a nacelle (4);

a rotor (2) with a rotor shaft (3) having a far end;

a transmission box (8) with i) a reaction arm (21), and ii) a planetary gear unit (12) connected to the rotor shaft (3), the planetary gear unit (12) comprising a planet carrier (13), the transmission box (8) supported by the far end of the rotor shaft (3); and a first rotor bearing (5) and an indirect bearing (22) supporting the rotor shaft (3) in relation to the nacelle (4), the first rotor bearing (5) being directly fixed to the nacelle (4), the indirect bearing (22) being situated at an inlet of the transmission box (8), the rotor shaft (3) bearing-mounted with i) the first rotor bearing (5) directly to the nacelle (4), and ii) the second rotor bearing (22) to a part of the transmission box (8), wherein, during working of the planetary gear unit (12), the reaction arm (21) transmits a reaction torque round the rotor shaft (3) from the transmission box (8) to the nacelle (4) sufficient to prevent the transmission box (8) from turning along with the rotor shaft (3), the planet carrier (13) is bearing-mounted in the transmission box (8) by only one planet carrier bearing (22) at the most, the indirect bearing (22) being the one planet carrier bearing, and the reaction arm (21) is arranged adjacent the planet carrier bearing (22).

\* \* \* \* \*